Patented Aug. 24, 1943

2,327,939

UNITED STATES PATENT OFFICE 2,327,939

METHOD OF HEAT-STERILIZING FRESH LATEX AND PRODUCT THEREOF

William D. Stewart, Akron, Ohio, assignor to The B. F. Goodrich Company, New York, N. Y., a corporation of New York No Drawing. Application December 6, 1940, Serial No. 368,910

14 Claims. (Cl. 260—815)

This invention relates to a method of preserving latex and particularly to a method of sterilizing freshly-collected latex and to the product thereof.

Latex that has been freshly-collected from the rubber trees contains enzymes that, together with the bacteria picked up in handling the latex, cause the latex to putrefy and coagulate within a relatively short time. Various methods of preserving the latex have been proposed in the past, such as the ammonia treatment now commonly used, but all these have been only generally effective and all have been more or less unsatisfactory. It has also been proposed to kill the bacteria present in latex by heating it but prior methods of heat-sterilizing latex do not work satisfactorily with fresh latex, apparently due to the presence of heat-coagulable proteins present in freshly-collected latex. These proteins cause coagulation to set up in the latex before a sterilizing temperature can be reached.

I have discovered a method of heat-sterilizing freshly-collected latex that produces a sterile, stable latex cheaply and conveniently. By the method of this invention the freshly collected latex is treated with an alkali, preferably ammonia or with a buffer solution, until the pH is raised to a point not less than 9.8 and not more than 10.0. The latex is then heated to a temperature not less than 45° C. nor greater than 75° C. for at least 10 hours to destroy the bacteria. This heating sterilizes the latex but because of its high pH the heating does not bring about coagulation of the latex. The pH values of from 9.8 to 10.0 and the temperature of from 45° C. to 75° C. are critical in producing a heat-sterilized latex according to the method of this invention.

As a practical embodiment of this invention freshly-collected latex is treated with ammonia until the pH is raised to between 9.8 and 10.0. This requires about 0.25% to 0.30% of ammonia by weight of the latex. This treated latex is then heated in containers as by immersing them in hot water at a temperature of 58° C. to 63° C. for 24 hours. It is advisable that the containers be sealed during this heating to prevent loss of the ammonia and also to prevent the introduction of new bacteria. At the end of the heating period the latex is sterile and as long as no new bacteria are added the latex will remain fresh and uncoagulated practically indefinitely. The containers are kept sealed until it is desired to use the latex thus preventing any introduction of new bacteria.

It is possible to use practically any method of raising the pH to the specified range of 9.8 to 10.0, including the use of buffer solutions or of alkalis as hereinabove indicated. However, ammonia is preferred for raising the pH as for some uses of the latex it is not desirable to introduce into the latex a fixed alkali or other material not conveniently removable. Ammonia is an alkali that, if desired, can be easily removed from the latex although because of the small amounts used in this process it is very seldom, if ever, that it will be necessary to remove the ammonia.

It has been found advantageous in some instances to add to the latex that is to be sterilized by the method of this invention small amounts of detergents such as soft soaps, fatty acids, shellac soaps, sulfated alcohols, and sulfonated alcohols. These have a certain value as germicides and help destroy the bacteria. These detergents are used in amounts varying between 0.05% and 0.10% by weight of the latex and may be introduced into the latex either prior to or after addition of the ammonia. It has likewise been found advantageous, in some instances, to add to the latex bactericides or germicides of stronger powers than the detergent mentioned above in order to kill the bacteria and to destroy any new bacteria that may be introduced later into the latex. These bactericides and germicides may be added either prior to or after the heating, but preferably after, and may comprise any of the well-known bacteria inhibitors such as phenolates, mercury salts, and the like. They may be used in any desired proportions in the latex but ordinarily not more than 0.20% of the germicide by weight of the latex will be necessary and may be used either alone or in combination with the above detergents.

I am aware that somewhat similar processes have been proposed for heat-sterilizing latex but attempts actually to utilize such prior processes to heat sterilize latex that has been freshly collected on the rubber plantations have resulted in failure, notwithstanding statements in some instances that the processes were designed especially to treat fresh latex. It appears that most prior investigators have, through necessity, worked not with fresh latex but with preserved latex (dialyzed or otherwise treated to remove the preservative in some instances) and the investigators have assumed that fresh latex and preserved latex would behave similarly in heat sterilization processes. I have found that such is not the case, however, and that prior processes are not satisfactory for heat-sterilizing fresh latex on the plantations. Experimental work on the present invention indicates that the different behavior of fresh latex and preserved latex may be due to the presence of heat-coagulable proteins in fresh latex which are not present in preserved latex. The heat sterilization of freshly-collected latex and of preserved latex presents, therefore, two quite different problems. Insofar as I am aware the method of the present invention is the first really practical process for use on the plantations in heat-sterilizing latex freshly collected from the rubber trees.

The method of this invention has the advantage that only very small amounts of alkali, for example ammonia, are needed. It also produces a latex that is absolutely sterile and one that will keep indefinitely as long as no new bacteria are introduced into the latex. This sterile latex does not require the blowing off of ammonia before the latex is used in manufacturing and the latex has the appearance and processing characteristics of freshly-collected latex.

Having disclosed the method of my invention it is my desire to protect the invention broadly within the spirit and scope of the appended claims.

I claim:

1. The method of sterilizing freshly-collected latex which comprises adjusting the pH of the latex to not less than 9.8 nor more than 10.0 and thereafter heating the latex at a temperature below 75° C. but above 45° C. for at least 10 hours.

2. The method of sterilizing freshly-collected latex which comprises treating the latex with sufficient alkali to raise the pH of the latex to not less than 9.8 nor more than 10.0 and thereafter heating the latex at a temperature below 75° C. but above 45° C. for at least 10 hours.

3. The method of sterilizing freshly-collected latex which comprises treating the latex with sufficient alkali to raise the pH of the latex to not less than 9.8 nor more than 10.0 and thereafter heating the latex at a temperature not less than 58° C. nor more than 68° C. for from 24 to 48 hours.

4. The method of sterilizing freshly-collected latex which comprises treating the latex with sufficient ammonia to raise the pH of the latex to not less than 9.8 nor more than 10.0 and thereafter heating the latex at a temperature not less than 58° C. nor more than 68° C. for from 24 to 48 hours.

5. The method of sterilizing freshly-collected latex which comprises adjusting the pH of the latex to not less than 9.8 nor more than 10.0, adding a minor proportion of a germicide, and thereafter heating the treated latex at a temperature below 75° C. but above 45° C. for at least 10 hours.

6. The method of sterilizing freshly-collected latex which comprises adjusting the pH of the latex to not less than 9.8 nor more than 10.0, adding a minor proportion of a germicide, and thereafter heating the treated latex at a temperature not less than 58° C. nor more than 68° C. for from 24 to 48 hours.

7. The method of sterilizing freshly-collected latex which comprises treating the latex with sufficient alkali to raise the pH of the latex to not less than 9.8 nor more than 10.0, adding a minor proportion of a germicide and thereafter heating the treated latex at a temperature not less than 58° C. nor more than 68° C. for from 24 to 48 hours.

8. The method of sterilizing freshly-collected latex which comprises treating the latex with sufficient ammonia to raise the pH of the latex to not less than 9.8 nor more than 10.0, adding from 0.05% to 0.10% by weight of the latex of a detergent, and heating the treated latex at a temperature not less than 58° C. nor more than 68° C. for from 24 to 48 hours.

9. The method of sterilizing freshly-collected latex which comprises treating the latex with sufficient ammonia to raise the pH of the latex to not less than 9.8 nor more than 10.0, adding from 0.05% to 0.10% by weight of a member of the class consisting of soft soaps, fatty acids, shellac soaps, sulfated alcohols, and sulfonated alcohols, and heating the treated latex at a temperature not less than 58° C. nor more than 68° C. for from 24 to 48 hours.

10. Sterile latex prepared according to the method of claim 1.

11. Sterile latex prepared according to the method of claim 2.

12. Sterile latex prepared according to the method of claim 4.

13. Sterile latex prepared according to the method of claim 5.

14. Sterile latex prepared according to the method of claim 8.

WILLIAM D. STEWART.